United States Patent Office 3,108,846
Patented Oct. 29, 1963

3,108,846
DYEING PROCESS
Masaichi Utsunomiya, Ashiya City, Hachiro Hiyama, Ibaraki City, and Osamu Manabe, Sumiyoshi-ku, Osaka City, Japan, assignors to Asahi Dyestuffs Manufacturing Company, Limited, Higashi-Yodogawa-ku, Osaka City, Japan
No Drawing. Filed Jan. 9, 1961, Ser. No. 81,223
Claims priority, application Japan Jan. 18, 1960
3 Claims. (Cl. 8—37)

This invention relates to improvements in the dyeing method with sulfur dyestuffs. More particularly, the invention pertains to a dyeing process of natural, artificial and synthetic textile materials with a dyestuff or an intermediate of dyes of the general formula:

D—B—S·R

In this formula, D is a chromophoric group, representing a residual group of dyes or of intermediates of dyes. B is an insulating group, standing for —SO$_2$NH$_2$·Ar—, —CH$_2$·Ar—, —CONH·Ar— or

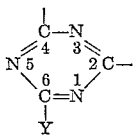

in which Ar is an o—, an M— or a p-phenylene group having 0 to 4 substituting radicals, and is bonded to the —S·R group; and Y is —OH, —NH$_2$, —OCH$_3$, —NH·C$_6$H$_5$, —NH·D or —S·R. In said triazine ring radical, the carbon atom at position 2 is directly attached to the —S·R group, and the carbon atom at position 4 is linked to the chromophoric group D via —NH group.

The —S·R group of the general formula D—B—S·R being a mercapto group or a group forming a mercapto group with alkali or a reducing agent, R is a hydrogen atom, an alkali metal atom,

—OR" or —CN, in which R' is a hydrogen atom, a methyl group or an ethyl group, and R" is a methyl group or an ethyl group.

Most of the sulfur dyestuffs used in the prior art are still unsatisfactory for producing desired brightness of color with a variety of shades. Particularly hardly available are reddish shades. For the sulfur atom is directly attached to the chromophoric group, and such linking has a tendency to make broad the absorption curve of the chromogen.

In contrast to said conventional dyestuffs, the sulfur atom of this invention is completely isolated from the chromophoric group D by means of the insulating group B, whereby a variety of color with rich bright shades, including reddish shades, is produced to a satisfactory extent unimaginable in the prior art.

The textile material which is successfully colored with the dyestuff or intermediate of dyes of this invention comprises natural, artificial and synthetic textile materials made of cotton, viscose rayon, linen, wool, silk, polyvinylacetal, polyamide, acetylcellulose, polyacrylonitrile and its copolymers and polyester, including mixed and union fabrics of the fibers as specified above, all of which contain a reactive hydrogen atom.

PREPARATION OF DYESTUFF AND INTERMEDIATES OF DYES OF THE FORMULA D—B—S·R (1) Preparation of a series of dyestuffs and intermediates of dyes of this invention having a triazine ring radical

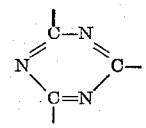

as the insulating group B is performed in the following manners:

A dye having an amino group or an amino-substituted intermediate of dyes capable of forming a dye by coupling with an aromatic diazo compound is reacted with cyanuric halide or one of its derivatives to produce a triazine derivative of the formula:

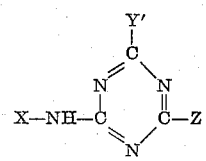

where X is a residual group of dyes or of intermediates of dyes; Z is a halogen atom; and Y' is a halogen atom, —OH, —NH$_2$, —OCH$_3$, —NH·C$_6$H$_5$ or —NH—X.

According to the number of the amino group attached to the starting material, more than one mol of cyanuric halide can be reacted therewith. For instance, one mol of a dye or one of its derivatives having 2 amino groups is reacted with 2 mols of cyanuric halide or one of its derivatives to produce a compound of the formula:

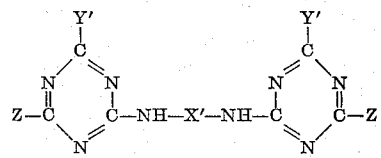

The intermediate product as represented in Formulas I and II is then treated with a compound having a sulfur atom to replace the halogen atom by —S·R to produce the sulfur dyestuff or intermediate of dyes of this invention having the formula:

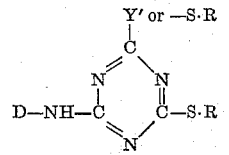

or

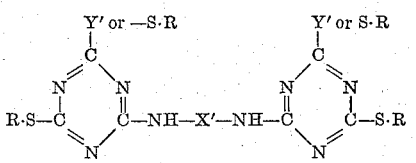

In practice of this invention, one method for preparing the intermediate product of Formula I is to react in a solvent with stirring at 0° to 20° C. a dye having an amino group, or an amino-substituted intermediate of dyes capable of forming a dye by coupling with an aromatic diazo compound, with cyanuric halide or one of its derivatives having 3 halogen atoms or 2 halogen atoms and —OH, —NH$_2$, —OCH$_3$, —NH·C$_6$H$_5$ or —NH—X. The resulting hydrogen halide is neutralized with an organic or inorganic base.

Another method for preparing the intermediate product of Formula I is to react at 10° to 50° C. 2,4-dihalogeno- 1,3,5-triazine derivative which is obtained by reacting the starting material as specified above with cyanuric halide, with sodium carbonate solution, aqueous ammonia, methyl alcohol solution of sodium methylate, aniline or solution of a dye having an amino group or of a derivative of said dye to replace Y′ by —OH, —NH₂, —OCH₃, —NH·C₆H₅ or —NH—X.

To prepare the dyestuff and intermediate of dyes of this series as represented in Formulas III and IV, the intermediate product of Formula I or II is reacted with aqueous solution of sodium sulfide, sodium bisulfide, thiourea xanthogenate or rhodanate to replace the halogen atom attached to the triazine ring radical by —SNa, —SH,

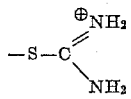

—S—OR″ or —SCN. Hydrochloric acid is added when rhodanate or xanthogenate is employed as a reactant. The mixture is heated to react at about 80° C.

Of the resulting products, the compound having

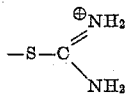

—S—OR″ or —SCN is water-insoluble and precipitates in itself. The product obtained by reacting sodium sulfide or sodium bisulfide is neutralized with mineral acid or oxidized by blowing air therethrough to precipitate the desired product. The water-soluble sulfonic acid group-substituted compound is neutralized with mineral acid or acetic acid, and salted out with sodium chloride, sodium sulfate or sodium acetate.

In case Y′ and Z of the triazine ring radical are both replaced by a halogen atom, the halogen atoms of such triazine compound can all be replaced by —S·R.

(2) Preparation of another series of dyestuffs and intermediates of dyes of this invention having —SO₂NH·Ar—, —CH₂·Ar— or —CONH·Ar— as the insulating group B is performed in the following manners:

Metal phthalocyanine, azo dye or a derivative of said dyes is reacted with aromatic amino compound to form the intermediate product having —SO₂NH·Ar·NH₂, —CH₂·Ar·NH₂ or —CONH·Ar·NH₂. When nitro compound is employed as a reactant, the product is reduced. One or more amino groups can be bonded to the chromophoric group D. The resultant intermediate product is then diazotized and reacted with sodium sulfide, sodium bisulfide, thiourea, xanthogenate or rhodanate to replace the terminal —NH₂ group by an —S·R group such as —SNa, —SH,

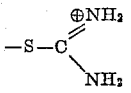

—S—OR″ and —SCN.

For instance, to one mol of copper phthalocyanine disulfochloride suspended in water are added 2 mols of p-phenylenediamine, and the mixture is stirred for 10 hours at a low temperature ranging from 0° to 15° C. The resulting copper phthalocyanine disulfo-p-aminoanilide is tetrazotized in the presence of hydrochloric acid, and the product is reacted with excess thiourea at a low temperature ranging from 5° to 20° C. to form the desired isothiocarbamide derivative. Rhodanate employed in place of thiourea produces rhodan derivative. The chromophoric group D is isolated from the sulfur atom by —SO₂·NH·C₆H₅. Copper phthalocyanine tri-or tetra-sulfochloride employed as a starting material yields a compound having 3 or 4 —SO₂·NH·C₆H₅ groups bonded to the —S·R group.

As illustrated hereinbefore, the entire series of compounds of this invention can be easily modified by substituting X, Y′, Z and —S·R with a group as specified hereinbefore to produce a more variety of dyestuffs and intermediates of dyes with richer shades of color than is the case with the prior art. The dyestuffs and intermediates of dyes of this invention are all possessing excelled fastness to light and washing. Particularly, the products derived from Formula I have a pronounced affinity for textile materials when Y′ is replaced by —NH₂, —OCH₃ or —NH·C₆H₅.

DYEING PROCESS WITH DYESTUFFS AND INTERMEDIATES OF DYES OF THIS INVENTION

Dyeing of the textile materials as specified before with the dyestuff or intermediate of dyes of this invention is performed in the following manners:

The dyestuff having the sulfonic acid group bonded to the residual group of dyes is dissolved in water in amount of 0.1 to 20 weight percent per total weight of the textile material being colored. The dyestuff having no sulfonic acid group is dissolved in said weight percent in an aqueous solution of sodium hydroxide or sodium sulfide. To the solution thus prepared is then added 1 to 20 percent by weight of an initial condensation product of epoxyresins or aminoresins. The material being colored is dipped in or padded with the solution or printed with a paste prepared as will be illustrated later. Of said dyestuffs, the water-soluble dyestuff is employed in an identical manner as is the case with the ordinary direct dyestuffs, and the water-insoluble dyestuff is employed like the conventional sulfur dyestuffs.

Another method for employing the dyestuffs as specified above is to dissolve the water-soluble dyestuff in water or the water-insoluble dyestuff in aqueous solution of sodium hydroxide. The textile material being colored is dipped in or padded with the solution or printed with a paste to be specified later. The resulting material is then dipped in an aqueous solution containing 1 to 20 percent by weight of an initial condensation product of epoxyresins or aminoresins.

The intermediate of dye of this invention is dissolved in water. An initial condensation product of epoxyresins or aminoresins is added. The textile material being colored is then dipped in or padded with the resultant solution, and treated with a diazo compound in an identical manner as is the case with the azoic dyeing.

Another method of employing the intermediate of dye of this invention is to dip or pad the textile material being colored in or with the aqueous solution of said intermediate of dye. The material is then treated with a diazo compound, and dipped in the aqueous solution of an initial condensation product of epoxyresins or aminoresins.

To cure the textile material treated in accordance with the method as specified above, heat is employed at a temperature varying with the species of the textile material being colored. For instance, cellulose and linen fabrics are heated at 80° to 200° C.; silk, wool and polyester fabrics at 80° to 160° C.; acetylcellulose, polyamide and acrylonitrile fabrics at 80° to 130° C., and polyvinylacetal fabrics at 80° to 100° C.

The initial condensation product of epoxyresin used in this invention comprises the initial condensation product of epichlorohydrine with bisphenol. Glycelol-1,3-dichlorohydrine is also employed.

The initial condensation product of aminoresin used in this invention comprises mono- and dimethylol urea, mono-, di- and trimethylol melamine, methyl derivatives of ethylene urea, dimethylol glyoxal monoureine, di- and tetramethylol glyoxal diureine, o-methyl derivatives of said methylol compounds, and water-soluble relatively higher condensation products of the compounds as specified above.

Zinc fluoborate, ethylenetriamine, p-phenylenediamine, phthalic anhydride, secondary ammonium phosphate, ammonium chloride or the like is employed as a catalyzer, where necessary, with the initial condensation product of epoxyresin or aminoresin as specified above.

The dyeing or impregnating process of this invention is a complex, inexplicable matter. Hypothetically, the dyestuff or intermediate of dye of this invention is adsorbed in the textile material under treatment in an identical manner as is the case with the conventional sulfur dyestuffs or direct dyestuffs. And the reactive group such as —SH, —OH and —$NH_2$ contained in the dye copolycondenses on being heated with the initial condensation product of epoxyresin or aminoresin.

The reaction may take place the other way round. The initial condensation product of epoxyresin or aminoresin may be first bonded to the reactive group —OH, —$NH_2$ or —CONH of the textile material being colored. Then the resulting textile material copolycondenses on being heated with the adsorbed dye.

In any case, the textile material being colored, the dyestuff or intermediate of dye of this invention and the synthetic resin employed copolymerize with one another to form a powerful covalent bond, producing marked fastness to light and washing. Unlike the conventional sulfur dyestuffs, the chromophoric group D is, as stated before, completely isolated from the sulfur atom by means of the insulating group B, so that the chromophore of the dyestuff or intermediate of dye of this invention is enabled to produce the intrinsic brilliance and brightness of color without being affected by the sulfur atom.

The molecules of the initial condensation product of epoxyresin and aminoresin employed in this invention copolycondense with each other to form higher molecular compounds. The textile material being colored becomes thereby markedly crease-resistant and water-proof, and attains the same order of handling as is obtained with the conventional resin finishing.

In the following examples are illustrated some of the preferred embodiments of this invention, where percentages and parts in use are by weight per initial weight of the textile material being colored, except otherwise stated, and squeezing is performed until the textile material picks up 100 percent of its weight of the solution, except otherwise specified.

*Example 1*

100 parts of polyamide fabrics are dipped for 30 minutes at 80° to 90° C. in 2,500 parts of aqueous solution containing 2.5% of the dyestuff of the formula

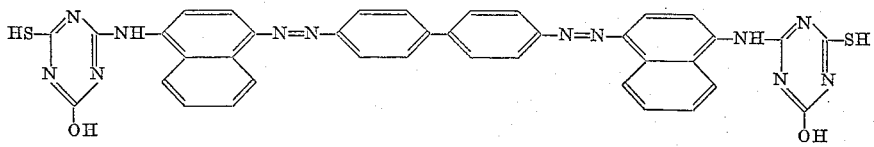

and 5% of sodium hydroxide. The material is squeezed and rinsed thoroughly. Rinsing may be performed after being immersed in a 0.1% aqueous solution of mineral acid or organic acid. The textile material is then dipped for 10 minutes at 10° to 30° C. in a methyl alcohol solution containing 5% of initial condensation product of epoxyresin and 0.5% of ethylenetriamine. After being squeezed, the material is heated for 30 minutes at about 120° C. and soaped. The resultant material is colored to a bright orange, possessing excellent fastness to light and washing.

Cotton and viscose fabrics treated in the same manner as described above produce the same result as specified above. The same result is also produced when p-phenylenediamine, phthalic anhydride or zinc fluoborate is employed in place of ethylenetriamine, and when initial condensation product of aminoresin is used in place of initial condensation product of epoxyresin with ammonium chloride or secondary ammonium phosphate as a catalyzer.

The dyestuff used in the dyeing process of the above example is prepared in the following manner:

One mol of powder dye prepared by coupling tetrazotized benzidine with α-naphthylamine is stirred at 0° to 5° C. in an acetone solution containing 2.1 mols of cyanuric halide. 2 mols of sodium bicarbonate are added, keeping the mixture slightly acidic. 2 mols of sodium hydroxide are then added at room temperature, and the solution is allowed to react for 2 hours. 2 mols of sodium sulfide are further added. After being stirred for 4 hours at 40° to 50° C., the mixture is neutralized with acetic acid. The acetone being removed, the precipitate is collected by filtration, rinsed with water and dried.

*Example 2*

25 parts of the dyestuff of the formula

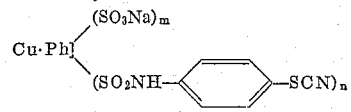

where [Cu·Ph] is a residual group of copper phthalocyanine, and $m$ and $n$, being positive integers, make 4, are dissolved with 40 parts of crystalline sodium sulfide in 70 parts of hot water to transform the —SCN group into a mercapto group. 20 parts of secondary ammonium phosphate, 50 parts of trimethylol melamine and 400 parts of 8% aqueous solution of tragacanth gum are added with stirring to make with water 1,000 parts of printing paste. The composition is applied to cotton fabrics on a roller machine. After being dried, the material is steamed in a pressure vessel for 20 minutes at 110° to 120° C., soaped in a warm soaping bath, rinsed and dried. The resultant brilliant greenish blue print exhibits very good fastness to light and washing.

Viscose staple-fiber fabrics treated in the same manner as described above also produce the same result as specified above.

*Example 3*

One part of the dyestuff of the formula

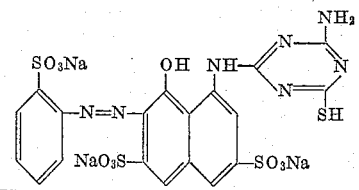

is dissolved in water with 20 parts of NN'-bismethoxymethyl urea and 0.6 part of ammonium chloride to make 100 parts of solution. 2 parts of cotton fabrics are dipped in the solution for 15 minutes at a temperature ranging from 0° to 50° C. After being rinsed, the material is pre-dried at 70° to 80° C., and heated for 10 to 20 minutes at 170° to 160° C. The material is then soaped in a warm soaping bath containing soap and sodium carbonate, rinsed and dried. The brilliant red color so obtained possesses excellent fastness to light and washing.

Viscose staple-fiber and rayon fabrics treated in the same manner as described above produce the same result as specified above. The same result is also obtained with dimethylolethylene urea and dimethylol urea, both used in place of aminoresin, and secondary ammonium phosphate used as a catalyzer.

Example 4

20 parts of the grounder of the formula

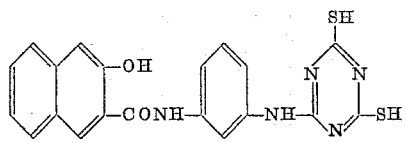

are kneaded in 200 parts of water with 18 parts of sodium hydroxide and 5 parts of methyl alcohol. Water is added to make 1,000 parts of solution. 20 parts of cotton fabrics are dipped in the solution for 5 minutes at room temperature, and squeezed. The material is then immersed again for 20 minutes in a diazotized 5-chloro-2-methoxyaniline solution, and squeezed. The material is further dipped for 5 minutes at 10° to 50° C. in 100 parts of ethyl alcohol solution containing 5 parts of initial condensation product of epoxyresin and one part of triethanolamine. The material is then squeezed, pre-dried at 80° C., treated for 3 to 8 minutes at 160° to 150° C. with super heated steam, soaped in a hot soaping bath, rinsed and dried. The resultant material is colored to a bright red, possessing very good fastness to light and washing.

Example 5

100 parts of woolen fabrics are dipped in 5,000 parts of aqueous solution containing one part of the dyestuff of the formula

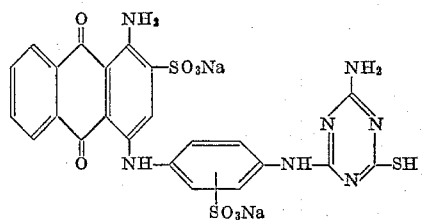

and 20 parts of trimethylol melamine. 0.5 part of acetic acid is added. The dyeing bath is then heated gradually to 90° to 95° C., and kept at said temperature range for about 30 minutes. The material is then squeezed, rinsed, soaped, rinsed and dried. The resultant blue color exhibits marked fastness to light and washing.

Silk fabrics treated in the same manner as described above produce the same effect as specified above.

Example 6

5 parts of viscose staple-fiber fabrics are dipped at room temperature in 200 parts of aqueous solution containing 0.1 part of the dyestuff of the formula

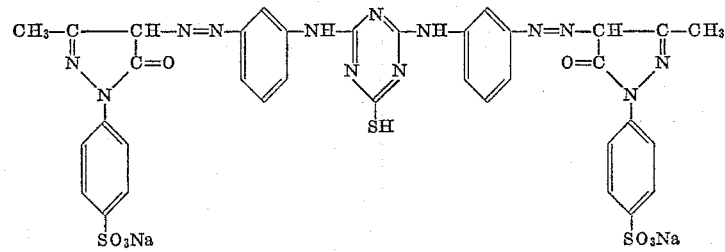

20 parts of dimethoxydimethylol urea, one part of secondary ammonium phosphate and 20 parts of sodium chloride, and heated to 100° C. during one hour. After being squeezed, thoroughly rinsed, soaped, rinsed and dried, the resultant material is colored to a brilliant yellow, possessing pronounced fastness to light and washing.

Cotton and linen fabrics treated in the same manner as described above produce the same result as specified above.

Example 7

One part of the dyestuff of the formula

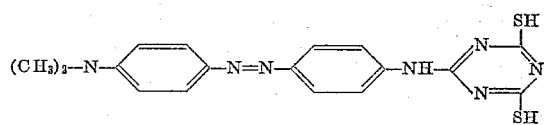

is kneaded in water with a nonionic detergent. 20 parts of initial condensation product of epoxyresin and one part of ethyltriamine are added with water to make 4,000 parts of dispersion. 100 parts of polyamide fabrics are dipped in the dispersion at room temperature. The temperature is gradually raised, and the dyeing bath is heated for one hour at 90° to 95° C. After being rinsed, the material is soaped, rinsed and dried. The resultant material is colored to a bright yellow, possessing very good fastness to light and washing.

Cellulose acetate fabrics treated in the same manner as described above produce the same effect as specified above.

Example 8

One part of the dyestuff of the formula

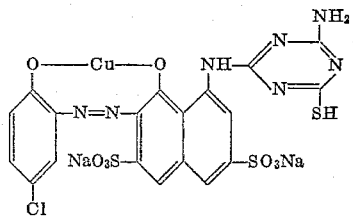

is dissolved in water with 10 parts of tetramethyl glyoxal diureine and 3 parts of ammonium chloride to make 100 parts. Cotton fabrics are dipped in the solution for 5 minutes at room temperature, squeezed, dried at 80° C., and heated for 20 to 10 minutes at 150° to 160° C. The material is then soaped in a hot bath of soap and sodium carbonate, rinsed and dried in air. The resultant material is dyed to a brilliant violet, possessing marked fastness to light and washing.

Viscose staple-fiber fabrics treated in the same manner as described above produce the same effect as specified above. The same result is also obtained with dimethyl glyoxal monoureine, dimethoxydimethylol urea, trimethylol melamine and initial condensation product of epoxyresin employed in place of tetramethylol glyoxal diureine.

Example 9

5 parts of the dyestuff of the formula

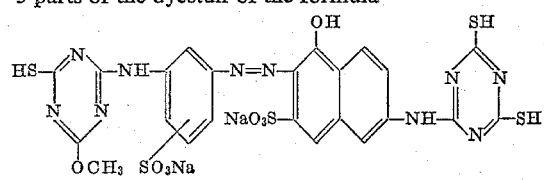

are dissolved in 2,000 parts of warm water. 0.5 part of sulfuric acid is added. 100 parts of polyamide fabrics are dipped in the solution at 40° C. The bath is then heated for 30 minutes to boil, and kept at the boiling temperature for one hour. The material is squeezed and rinsed, and then immersed in an aqueous solution containing 3% of Epikote 562 (Shell Petroleum Inc., U.S.A.; containing 0.27% of triethylenetetramine). The material is then squeezed, pre-dried at 60° to 70° C., heated for 30 minutes at 120° C., soaped, rinsed and dried. The resultant reddish orange color possessses very good fastness to light and washing.

The foregoing examples are all instances of preferred embodiments shown and described for the purpose of illustrating the principles of this invention, and it will be apparent to one skilled in the art that extensive changes and modifications can be made in the embodiments without substantially departing from said principles. This invention therefore naturally includes all possible modifications and changes encompassed within the spirit and scope of the appended claims.

What we claim is:

1. A process for coloring textile material having a reactive hydrogen atom which comprises impregnating said textile materials in aqueous medium containing a water-soluble chromophoric compound having the formula

D—NH—B—S·R wherein D—NH is a chromophoric group, B is a member selected from group consisting of —SO$_2$·NH·Ar—, —CH$_2$·Ar—, —CONH·Ar—, and

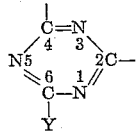

Ar being a member selected from the group consisting of an o-, an m- and a p-phenylene radical having from 0 to 4 substituting groups and being attached to the —S·R group, Y being a member selected from the group consisting of —OH, —NH$_2$, —OCH$_3$, —NH·C$_6$H$_5$, —NH·D and —S·R, the carbon atom at position 2 of said triazine ring being attached to the —S·R group, and the carbon atom at position 4 of said triazine ring being attached to said chromophoric group D—NH and R is a radical selected from the group consisting of hydrogen, alkali metal,

—OR″ and —CN; wherein R′ is a radical selected from the group consisting of hydrogen, methyl and ethyl, and R″ is a radical selected from the group consisting of methyl and ethyl; together with a water-soluble condensation product selected from the group consisting of water-soluble urea-formaldehyde condensation products and water-soluble condensation products of epoxy resin;

and heating the textile material thus treated at a temperature ranging from 80° to 200° C., whereby said chromophoric compound is chemically combined with said condensation product in the course of ensuing copolymerization and the copolymer thus obtained is chemically fixed with the free end of the condensation product part thereof to the textile material.

2. The process of claim 1, wherein the textile material is first impregnated with said water-soluble chromophoric compound, treated thereafter with said water-soluble condensation product, and finally heated at a temperature ranging from 80° to 200° C.

3. The process of claim 1, wherein said water-soluble chromophoric compound and condensation product are simultaneously applied in the state of a printing paste to the textile material to be printed.

References Cited in the file of this patent

UNITED STATES PATENTS 2,093,651    Widmer _____ Sept. 21, 1937
2,978,289    Barker et al. _____ Apr. 4, 1961

OTHER REFERENCES

Broden et al.: Amer. Dyestuff Reporter, Jan. 4, 1954, pp. P6–P13.